May 20, 1947.　　　　G. CANNOVA　　　　2,420,733
FASTENER RECEPTACLE
Filed Feb. 8, 1944　　　　2 Sheets-Sheet 1
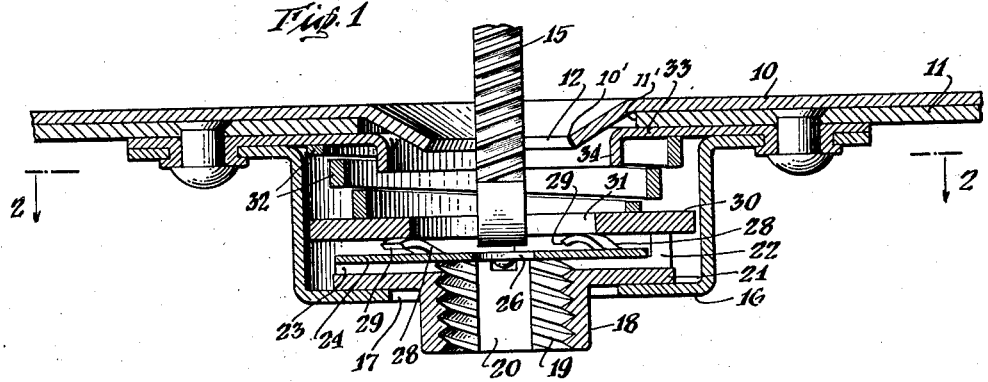
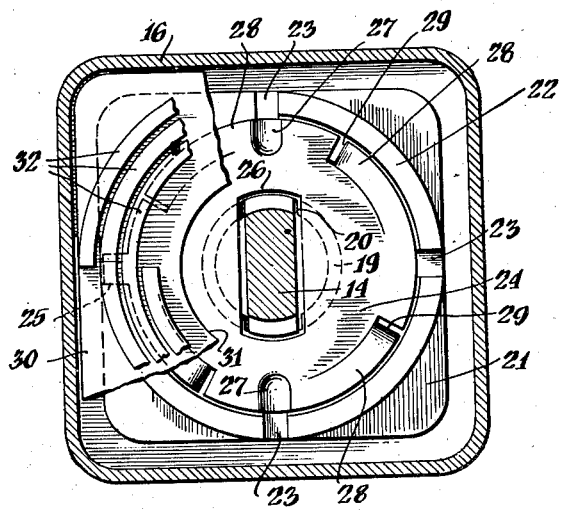
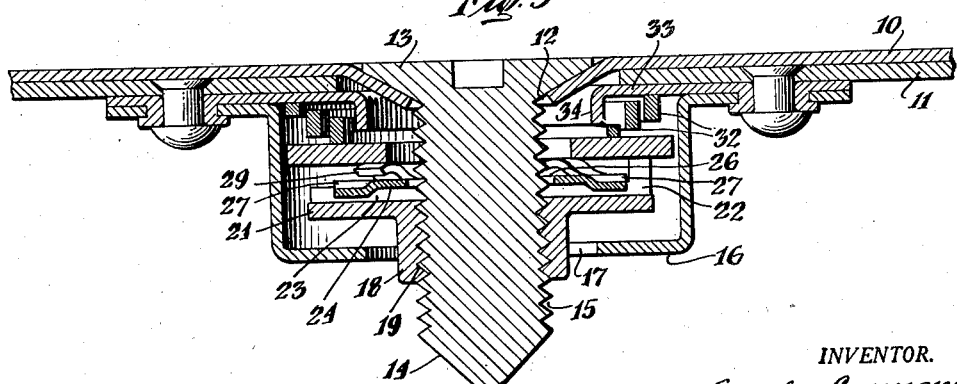
INVENTOR.
George Cannova
BY
ATTORNEYS May 20, 1947.  G. CANNOVA  2,420,733
FASTENER RECEPTACLE
Filed Feb. 8, 1944  2 Sheets-Sheet 2
Fig. 4
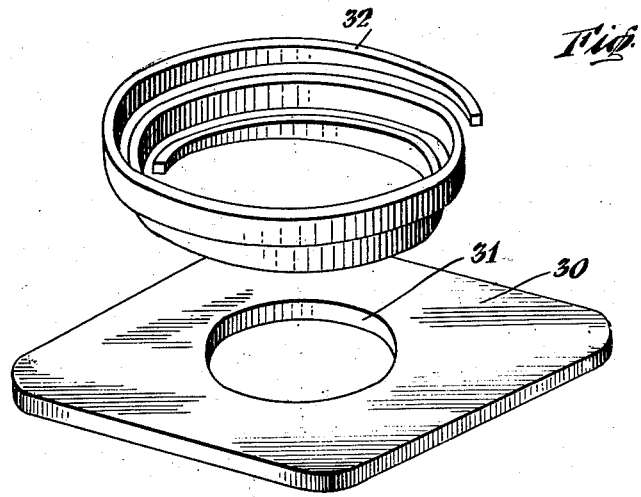
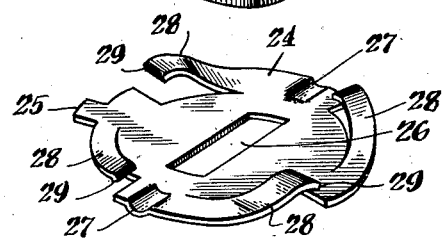
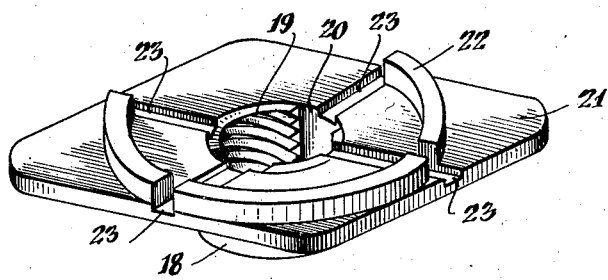
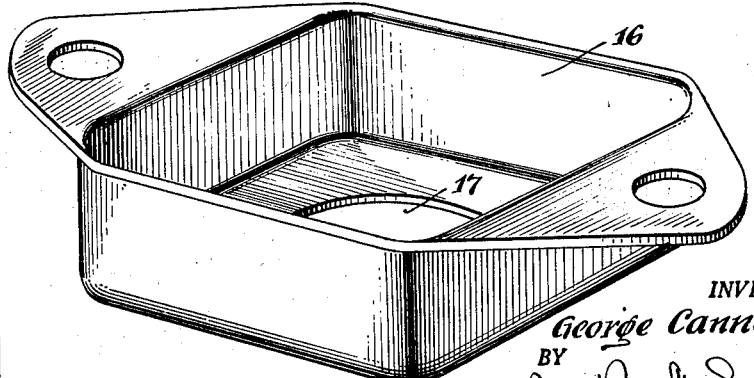
INVENTOR.
George Cannova
BY
ATTORNEYS Patented May 20, 1947

2,420,733

UNITED STATES PATENT OFFICE 2,420,733

FASTENER RECEPTACLE

George Cannova, Flushing, N. Y., assignor to Camloc Fastener Corporation, New York, N. Y., a corporation of New York Application February 8, 1944, Serial No. 521,497

2 Claims. (Cl. 24—221)

This invention relates to a structurally and functionally improved fastener assembly and in its more specific aspects aims to provide a structure of this nature by means of which two members—such as material sheets—may be secured against movement and/or detachment with respect to each other.

It is an object of the invention to furnish a unit of this type and which will include a detent structure incorporating resiliency; it being unnecessary, however, to overcome the loading force or strain to which the fastener parts are subjected in order to effect an operation of the detent structure.

A further object is that of providing a fastener assembly which will include relatively few and simple parts, each individually rugged in construction and capable of manufacture by quantity production methods; such parts being capable of ready assemblage and when so assembled operating over long periods of time with freedom from all difficulties.

With these and other objects in mind, reference is had to the attached sheets of drawings illustrating one practical embodiment of the invention, and in which:

Fig. 1 is a sectional side view taken through mounting members and especially the stud receptacle;

Fig. 2 is a sectional plan view taken along the lines 2—2 and in the direction of the arrows as indicated in Fig. 1, said parts being broken away;

Fig. 3 is a view similar to Fig. 1 but showing the stud member applied to the receptacle; and Fig. 4 is an exploded view of the stud receptacle assembly and showing the several parts of the same in perspective.

With primary reference to Figs. 1 and 3, it will be seen that the reference numerals 10 and 11 indicate mounting members in the form of sheets. These members are formed with apertures 10' and 11', respectively, and adjacent the aperture of sheet 10, that mounting member may be dimpled or formed with an inwardly and downwardly inclined surface. Such construction is preferable, in that a proper bearing is furnished for the head 13 of a stud which includes a shank portion 14.

Having in mind that the present invention has primary reference to the stud receptacle, the structure of the stud has been only generally illustrated. As shown, it includes, according to one aspect, a shank formed with threads and which latter are interrupted. According to another aspect, the shank might be defined as comprising a relatively thin and flattened body, the side edges of which are threaded as indicated at 15, the threads preferably having a relatively steep helix angle, as shown in Fig. 1. In any event, it will be appreciated that the dimensions of this member may be varied in numerous respects and also that various auxiliary or integral parts may be associated with or form a part of the same.

Now considering the structure of the stud receptacle, it will be seen with reference to all figures that this preferably includes a casing 16 secured in any desired manner to the sheet 11 but in registry with the aperture formed in that sheet. This casing is formed with an aperture 17 in its base portion and which should be substantially aligned with the aperture of the sheet 11. Conveniently extending through the aperture 17 is the body of a nut 18 formed with interior threads 19 which cooperate with threads 15 on the stud. These threads are interrupted throughout a zone having a width at least equal to that of the shank 14. The threads 15 and 19 are of such character that they may intermesh upon relative rotation of the stud with respect to the nut.

The nut 18 is formed with or connected with an outwardly extending part or flange 21. This has an area such that it may not pass through the aperture 17. An annular flange 22 may be integral with the part 21, such flange extending through an arc of substantially 270°. This flange as especially shown in Fig. 4 is preferably interrupted throughout 90°. As also shown best in that figure, the upper face of the part 21 may be formed with radially extending grooves 23, the flange 22 being interrupted in line with these grooves.

Rotatably supported upon part or flange 21 is a detent plate 24. The latter is of a diameter such that it may be disposed upon the inner surface of part 21 and the flange 22 may extend concentrically with respect to its periphery. A projection 25 conveniently forms an integral part of plate 24 and in conjunction with the ends of flange 22, functions as a stop to limit rotation of the plate with reference to the nut. A central aperture 26 is formed through the plate and is of a configuration such that the shank of the stud may pass therethrough. However, the parts should be so shaped that relative turning (beyond a very minor degree) will be prevented.

Conveniently, the body of plate 24 may be struck inwardly adjacent the periphery on opposite sides thereof, as indicated by the reference numerals 27. The pair of instruck portions 27 thus furnished cooperate with the grooves 23 so that a detent or locking structure is furnished; the projections normally riding within the grooves. Also, tab portions 28 are struck out of the plate and furnish resilient tongues. These tabs conveniently have their free ends curved inwardly toward the surface of the plate as indicated at 29. Overlying the plate 24 and conveniently resting upon the flange 22 is a separator plate 30. This is formed with a central aperture 31. In common with the part 21, it has a configuration such that it may not rotate with respect to the casing 16. Also, it may be of larger dimensions than the part 21 in that the latter should, of course, be capable of certain lateral movements in order that the parts may properly center and cooperate with each other.

Extending in turn above the plate 30 is a convolute spring 32. As illustrated, the successive convolutions may be of increasing diameter and the ends of the spring may be reduced. This may be achieved by, for example, grinding. As a consequence of the convolutions being of different diameters, it follows that as the spring is compressed these convolutions will not engage each other. Rather, they will nest one within the other.

As previously brought out, this spring bears against the plate 30. Conveniently, there may be associated with the casing 16 a plate 33. This plate is apertured in line with the opening 11' of the mounting member 11 and may be formed with a flange 34 defining such opening. This flange will assist in confining the spring. It is, of course, to be understood that the configuration of these several parts and especially the springs might be varied in numerous respects. The main factor to be borne in mind is that, by employing springs or their functional equivalents, separate load and detent factors are provided.

Thus, it will be understood that with the parts assembled in the manner shown in Figs. 1, 2 and 3 the operator may project the shank 14 of the stud to a point wherein the head 13 bears against the surface of sheet 10. In such projection the stud will pass through and be guided by the edges of aperture 26. Consequently, the threaded edge portions 15 of the stud will pass along the zones 20 of the nut and this stud will—with the parts proportioned as shown—project beyond the casing 16 and the end of the nut. Thereupon, by simply turning this stud, threads 15 are caused to engage threads 19. As a result of these threads having a relatively steep helix angle, such engagement will cause the nut 18 to be drawn upwardly along the shank 14, when viewed as in Fig. 1. This effect has been illustrated in Fig. 3.

When the parts are in this relation, the plate 24 is maintained in proper position by means of the detent structure. More particularly, the tongue or tab portions 28 press against the plate 30 and serve to retain the projections 27 within the grooves 23. When the stud is rotated from one position to another, the projections 27 leave one pair of radially aligned grooves 23, ride over the surface of plate 24, and come to rest in another pair of grooves 23. As the stud rotates, the plate 24 turns with it and preferably until the projections 27 have travelled through a 90° arc. Thereupon, the detent structure will again become operative because the projecting portions 27 now extend into a different pair of the grooves 23. This maintains the stud in position. Obviously, upon its being desired to uncouple the stud from the nut by rotating the former in a reverse direction with respect to the latter, the plate 24 will again be indexed to its initial position. Movement beyond the proper points is, of course, prevented by the stop structure furnished by the extension 25.

Assuming that sheets 10 and 11 are in face-to-face contact and that the stud has been rotated to its fullest extent, the aforementioned upward movement of the nut 18 will, of course, cause plate 30 to be similarly moved. This will in turn cause the spring 32 to be compressed. If the sheets 10 and 11 or any equivalent mounting members tend to separate, it is, of course, apparent that the spring 32 will be compressed to a greater extent. However, regardless of the degree of such compression, it is apparent that it will not affect the intimacy of engagement of the detent parts. Rather, irrespective of conditions of load, the units of this assembly are caused to cooperate merely by the spring tongues 28 or their equivalents. Therefore, an operator, in desiring to effect an uncoupling of the parts of the fastener, will not have to overcome the load on the spring 32 in order to effect a release of the detent structure. Rather, the resistance to movement of the latter will at all times be substantially equal and irrespective of varying load conditions.

Thus, it is obvious that among others the several objects of the invention as specifically aforenoted are achieved. It will likewise be apparent that numerous changes in construction and rearrangements of the parts might be resorted to without departing from the spirit of the invention as defined by the claims.

I claim:

1. A stud receptacle for a fastener assembly, said receptacle including a movably mounted member to be engaged and subjected to loading by a stud, a part extending from said member, a locking plate movably mounted upon said part and providing in cooperation therewith a detent structure to normally maintain said plate in a predetermined position with reference to said part, a flange extending from said part and enclosing said plate, and a loading spring so positioned relative to the flange as to act against said flange to yieldingly support said member.

2. A stud receptacle for a fastener assembly, said receptacle including a movably mounted member to be engaged and subjected to loading by a stud, a part extending from said member, a locking plate movably mounted upon said part and providing in cooperation therewith a detent structure to normally maintain said plate in a predetermined position with reference to said part, a flange extending from said part and enclosing said plate, a loading spring so positioned relative to the flange as to act against said flange to yieldingly support said member, said flange being interrupted throughout a portion of its length, and a projection forming a part of said plate and engaging the end of said flange to provide a stop structure limiting the movements of said plate with respect to said member.

GEORGE CANNOVA.

REFERENCES CITED

The following references are of record in the file of this patent:

UNITED STATES PATENTS

| Number | Name | Date |
|---|---|---|
| 2,337,483 | Marty | Dec. 21, 1943 |
| 2,374,679 | Hallock | May 1, 1945 |
| 2,382,973 | Cannova | Aug. 21, 1945 |
| 2,356,162 | Johnson et al. | Aug. 22, 1944 |